(12) United States Patent
Teraoka

(10) Patent No.: US 9,575,292 B2
(45) Date of Patent: Feb. 21, 2017

(54) CAMERA LENS

(71) Applicant: Hiroyuki Teraoka, Shenzhen (CN)

(72) Inventor: Hiroyuki Teraoka, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/011,593

(22) Filed: Jan. 31, 2016

(65) Prior Publication Data

US 2016/0349486 A1     Dec. 1, 2016

(30) Foreign Application Priority Data

May 28, 2015   (JP) .................................. 2015-108045

(51) Int. Cl.
*G02B 13/18*   (2006.01)
*G02B 13/00*   (2006.01)
*G02B 9/60*    (2006.01)

(52) U.S. Cl.
CPC ............. *G02B 13/0045* (2013.01); *G02B 9/60* (2013.01)

(58) Field of Classification Search
CPC ........ G02B 3/00; G02B 27/0025; G02B 13/18; G02B 9/60; G02B 3/04; G02B 13/04
USPC .................................. 359/642, 708, 713, 714
See application file for complete search history.

(56) References Cited

U.S. PATENT DOCUMENTS

2010/0315723 A1* 12/2010 Noda ............................ 359/714

FOREIGN PATENT DOCUMENTS

JP       2014- 197104       10/2014
JP       2014-197105        10/2014

* cited by examiner

*Primary Examiner* — James Greece
(74) *Attorney, Agent, or Firm* — Na Xu; IPro, PLLC

(57) ABSTRACT

A camera lens includes, lined up from the object side to the image side: a first lens with positive refractive power, a second lens with negative refractive power, a third lens with positive or negative refractive power, a fourth lens with positive refractive power, and a fifth lens with negative refractive power. The camera lens satisfies specific conditions.

4 Claims, 7 Drawing Sheets

CAMERA LENS

FIELD OF THE INVENTION

The present invention discloses a camera lens, in particular to a camera lens of mobile phone or WEB camera equipped with high-pixel CCD, CMOS and other camera elements.

DESCRIPTION OF RELATED ART

In recent years, a variety of cameras equipped with CCD, CMOS or other camera elements are widely popular. Along with the development of miniature and high performance camera elements, the ultrathin and high-luminous flux (Fno) wide-angle camera lenses with excellent optical properties are needed in society.

The technology related to the camera lens composed of five ultra-thin, high-luminous flux f value wide angle lenses with excellent optical properties is developed gradually. The camera lens mentioned in the proposal is composed of 5 lenses, which are lined up in turn from the object side as follows: a first lens with positive refractive power, a second lens with negative refractive power, a third lens with positive or negative refractive power, a fourth lens with positive refractive power, a fifth lens with negative refractive power.

The camera lens in embodiments 1 to 6 in the special published bulletin No. 2014-197105 is composed of 5 lenses described above, but the distribution of the refractive power of the first lens and the shape of the four lens and the fifth lens are inadequate, therefore Fno≥2.45, 2ω≤70.4°, wide-angle and Fno luminous flux are not sufficient.

The camera lens in embodiments 1 to 5 in the special published bulletin No. 2014-197104 is composed of 5 lenses described above, but the shape of the fourth lens and the fifth lens is inadequate. The proportion of the axial distance between the image side of the forth lens L3 and the object side of the fourth lens L4 to the overall focus distance of the camera lens is not proper, therefore 2 ω=71.4° and the wide angle are not sufficient.

Therefore, it is necessary to provide a new camera lens to overcome the problems mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF MAJOR COMPONENT SYMBOLS

LA: Camera lens.
S1: Open aperture.
L1: The first lens.
L2: The second lens.
L3: The third lens.
L4: The fourth lens.
L5: The fifth lens.
GF: G glass plate.
R: The curvature radius of the optical surface is the center curvature radius of lens.
R1: The object side curvature radius of the first lens L1.
R2: The curvature radius of the image side of the first lens L1.
R3: The object side curvature radius of the second lens L2.
R4: The image side curvature radius of the second lens L2.
R5: The object side curvature radius of the third lens L3.
R6: The image side curvature radius of the third lens L3.
R7: The object side curvature radius of the fourth lens L4.
R8: The image side curvature radius of the fourth lens L4.
R9: The object side curvature radius of the fifth lens L5.
R10: The image side curvature radius of the fifth lens L3.
R11: The object side curvature radius of the glass plate GF.
R12: The image side curvature radius of the glass plate GF.
d: Center thickness of lenses or the distance between lenses.
d0: The axial distance from the open aperture S1 to the object side of the first lens L1.
d1: The center thickness of the first lens L1.
d2: The axial distance between the image side of the first lens L1 and the object side of the second lens L2.
d3: The center thickness of the second lens L2.
d4: The axial distance between the image side of the second lens L2 and the object side of the third lens L3.
d5: The center thickness of the third lens L3.
d6: The axial distance between the image side of the third lens L3 and the object side of the fourth lens L4.
d7: The center thickness of the fourth lens L4.
d8: The axial distance between the image side of the fourth lens L4 and the object side of the fifth lens L5.
d9: The center thickness of the fifth lens L5.
d10: The axial distance between the image side of fifth lens L5 and the object side of the glass plate GF.
d11: The center thickness of the glass plate GF.
d12: The axial distance from the image side to the imaging plane of the glass plate GF.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby is only to explain this disclosure, not intended to limit this disclosure.

Figure 1:
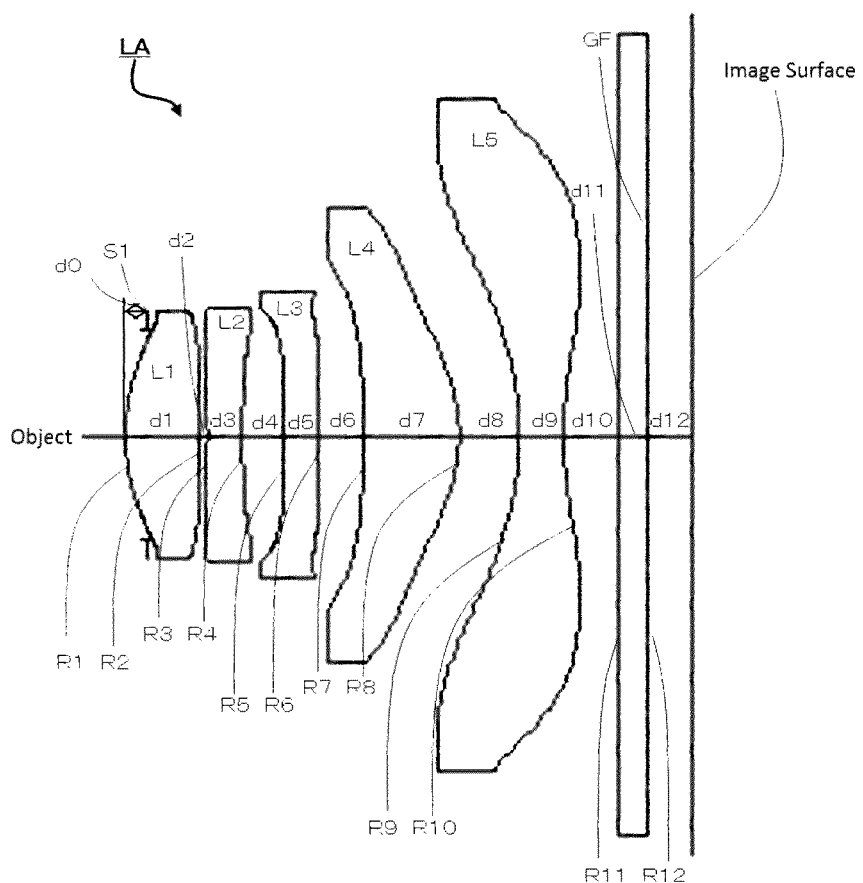
FIG. 1 is the structure diagram of the camera lens LA in one embodiment of the present invention.

The camera lens in one embodiment of the present invention is explained with design drawings. FIG. 1 shows the structural diagram of one embodiment of the camera lens of the present invention. The camera lens LA is composed of 5 lenses, lined up from the object side to the image side in turn as follows: a first lens L1, a second lens L2, a third lens L3, a fourth lens L4 and a fifth lens L5. A glass plate GF is provided between the fifth lens L5 and the imaging plane. The glass plate GF is a glass cover or a light filter with IR cut-off filtration and other functions, or, the glass plate GF is not be provided between the fifth lens L5 and the imaging plane.

The first lens L1 has positive refractive power. The second lens L2 has negative refractive power. The third lens L3 has positive or negative refractive power. The fourth lens L4 has positive refractive power. The fifth lens L5 has negative refractive power. In order to correct aberration better, the surface of five lenses is best designed to be non-spherical shape.

The camera lens LA satisfies the following specific conditions (1) to (8).

$$0.65 \leq f1/f \leq 0.78 \quad (1)$$

$$13.50 \leq |f3|/f \leq 45.00 \quad (2)$$

$$-1.20 \leq (R1+R2)/(R1-R2) \leq -0.75 \quad (3)$$

$$-0.15 \leq (R3+R4)/(R3-R4) \leq 0.93 \quad (4)$$

$$1.30 \leq (R7+R8)/(R7-R8) \leq 1.75 \quad (5)$$

$$0.03 \leq (R9+R10)/(R9-R10) \leq 0.50 \quad (6)$$

$$0.105 \leq d6/f \leq 0.150 \quad (7)$$

$$0.065 \leq d8/f \leq 0.150 \quad (8)$$

In which
f: Overall focal distance of the lenses.
f1: The focal distance of the first lens.
f3: The focal distance of the third lens.
R1: The object side curvature radius of the first lens.
R2: The image side curvature radius of the first lens.
R3: The object side curvature radius of the second lens.
R4: The image side curvature radius of the second lens.
R7: The object side curvature radius of the fourth lens.
R8: The image side curvature radius of the fourth lens.
R9: The object side curvature radius of the fifth lens.
R10: The image side curvature radius of the fifth lens.
d6: The axial distance between the image side of the third lens and the object side of the fourth lens.
d8: The axial distance between the image side of the fourth lens and the object side of the fifth lens.

The condition expression (1) specifies the positive refractive power of the first lens L1. When exceeding the lower limit value of the condition expression (1), the first lens L1 has too big positive refractive power, and it is difficult to correct the aberration and other issues, also not conducive to wide-angle development of lens. On the contrary, when exceeding the upper limit value, the first lens has too small refractive power, it is difficult to realize the ultrathin target of lens.

The condition expression (2) specifies the positive or negative refractive power of the third lens L3. If the value exceeds the limit of the condition expression (2), along with the ultra-thin development of the lens, it is difficult to correct the axial and abaxial chromatic aberration.

The condition expression (3) specifies the shape of the first lens L1. If the value exceeds the limit of the condition expression (3), along with the wide angle and ultra-thin development of the lens, it is difficult to correct the spherical aberration and other higher aberration issues.

The condition expression (4) specifies the shape of the second lens L2. If the value exceeds the limit of the condition expression (4), along with the wide angle and ultra-thin development of the lens, it is difficult to correct the spherical aberration and other higher aberration issues.

The condition expression (5) specifies the shape of the fourth lens L4. By satisfying the condition expression (5), the wide-angle and ultrathin development target of the camera lens can be realized truly.

The condition expression (6) specifies the shape of the fifths lens L5. If the value exceeds the limit of the condition expression (6), it is difficult to correct the distortion, aberration and other issues, and is not conducive to produce effectively telecentric lens.

The condition expression (7) specifies the proportion of the distance between the image side of the third lens L3 and the object side of the fourth lens L4 to the overall focus distance of the lenses. If the value exceeds the limit of the condition expression (7), it is not conducive to the wide angle and ultra-thin development of the lens.

The condition expression (8) specifies the proportion of the distance between the image side of fourth lens L4 and the object side of the fifth lens L5 to the overall focus distance of the lenses. If the value exceeds the limit of the condition expression (8), it is not conducive to the wide angle and ultra-thin development of the lens.

The second lens L2 has negative refractive power and satisfies following condition expression (9):

$$-2.00 \leq f2/f \leq -0.90 \quad (9)$$

In which
f: Overall focal distance of the lenses.
f2: The focal distance of the second lens.

The condition expression (9) specifies the negative refractive power of the second lens L2. If the value exceeds the limit of the condition expression (9), along with the wide angle and ultra-thin development of the lens, it is difficult to correct the axial chromatic aberration.

The fourth lens L4 has positive refractive power and satisfies the following condition expression (10):

$$0.50 \leq f4/f \leq 0.80 \quad (10)$$

In which
f: Overall focal distance of the lenses.
f4: The focal distance of the fourth lens.

The condition expression (10) specifies the positive refractive power of the fourth lens L4. By satisfying the condition expression (10), the wide angle and ultra-thin development of lens is effective.

The fifth lens L5 has negative refractive power and satisfies the following condition expression (11):

$$-0.70 \leq f5/f \leq -0.45 \quad (11)$$

In which
f: Overall focal distance of the lenses.
f5: The focal distance of the fifth lens.

The condition expression (11) specifies the negative refractive power of the fifth lens L5. By satisfying the condition expression (11), the wide angle and ultra thin development of lens, the axial distance from the image side to the imaging plane of the fifth lens can be ensured.

As five lenses of the camera lens LA have the structure described above and meet all condition expressions, the camera lens with 5 high-luminous flux lenses with excellent optical properties, in TTL (optical length)/IH (image height) ≤1.35, ultra-thin and wide-angle 2 ω≥78°, Fno≤2.2 becomes possible.

In embodiment:
f: F: The focal distance of the camera lens LA.
f1: The focal distance of the first lens L1.
f2: The focal distance of the second lens L2.
f3: The focal distance of the third lens L3.
f4: The focal distance of the fourth lens L4.
f5: The focal distance of the fifth lens L5.
Fno: F value.
2 ω: Total angle of view.
S1: Open aperture.
R: The curvature radius of the optical surface is the center curvature radius of lens.
R1: The object side curvature radius of the first lens L1.
R2: The image side curvature radius of the first lens L1.
R3: The object side curvature radius of the second lens L2.
R4: The image side curvature radius of the second lens L2.
R5: The object side curvature radius of the third lens L3.
R6: The image side curvature radius of the third lens L3.
R7: The object side curvature radius of the fourth lens L4.
R8: The image side curvature radius of the fourth lens L4.
R9: The object side curvature radius of the fifth lens L5.
R10: The image side curvature radius of the fifth lens L5.
R11: The object side curvature radius of the glass plate GF.
R12: The image side curvature radius of the glass plate GF;
d: Center thickness of lenses or the distance between lenses.
d0: The axial distance from the open aperture S1 to the object side of the first lens L1.
d1: The center thickness of the first lens L1.
d2: The axial distance between the image side of the first lens L1 and the object side of the second lens L2.
d3: The center thickness of the second lens L2.
d4: The axial distance between the image side of the second lens L2 and the object side of the third lens L3.
d5: The center thickness of the third lens L3.
d6: The axial distance between the image side of the third lens L3 and the object side of the fourth lens L4.
d7: The center thickness of the fourth lens L4.
d8: The axial distance between the image side of the fourth lens L4 and the object side of the fifth lens L5.
d9: The center thickness of the fifth lens L5.
d10: The axial distance between the image side of fifth lens L5 and the object side of the glass plate GF.
d11: The center thickness of the glass plate GF
d12: The axial distance from the image side to the imaging plane of the glass plate GF.
nd: Refractive power of line d.
nd1: Refractive power of line d of the first lens L1.
nd2: Refractive power of line d of the second lens L2.
nd3: Refractive power of line d of the third lens L3.
nd4: Refractive power of line d of the fourth lens L4.
nd5: Refractive power of line d of the fifth lens L5.
nd6: Refractive power of line d of glass plate GF.
v: Abbe number.
v1: Abbe number of the first lens L1
v2: Abbe number of the second lens L2.
v3: Abbe number of the third lens L3.
v4: Abbe number of the fourth lens L4.
v5: Abbe number of the fifth lens L5.
v6: Abbe number of the glass plate GF.
TTL: TTL: Optical length (the axial distance from the object side to the image side of the first lens L1).
LB: The axial distance from the image side to the imaging plane of the fifths lens L5 (including the thickness of the glass plate GF).
IH: Image height.

$$y=(x^2/R)/[1+\{1-(k+1)(x^2/R^2)\}^{1/2}]+A4\times 4+A6\times 6+A8\times 8+A10\times 10+A12\times 12+A14\times 14+A16\times 16 \quad (12)$$

In which, R is the axial curvature radius. k is the cone constant. A4, A6, A8, A10, A12, A14, A16 are aspherical coefficients.

As a matter of convenience, the aspheric surface of all lenses adopts the aspheric surface in condition expression (12), but, not limited to the polynomial forms of the aspheric surface in the condition expression (12).

Embodiment 1

Figure 2:
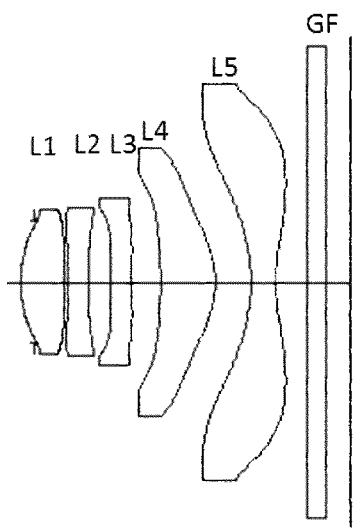
FIG. 2 is the structure diagram of the camera lens LA in embodiment 1.

FIG. 2 is the structure diagram of the camera lens LA in the first embodiment. The data in table 1 includes: The curvature radius R of the object side and the image side of the first lens L1 to the fifth lens L5 of the camera lens LA in the first embodiment, the center thickness of the lens and the distance d between lenses, refractive power nd, abbe number v. The data in table 2 includes: Cone constant k, aspheric coefficient.

TABLE 1

|  | R | d |  | nd |  | vd |
|---|---|---|---|---|---|---|
| S1 | ∞ | d0 = | −0.150 |  |  |  |
| R1 | 1.40428 | d1 = | 0.517 | nd1 | 1.5441 v1 | 56.12 |
| R2 | −25.77749 | d2 = | 0.047 |  |  |  |
| R3 | −6.53525 | d3 = | 0.243 | nd2 | 1.6397 v2 | 23.53 |
| R4 | 7.98916 | d4 = | 0.278 |  |  |  |
| R5 | 11.78920 | d5 = | 0.245 | nd3 | 1.6397 v3 | 23.53 |
| R6 | 10.22134 | d6 = | 0.341 |  |  |  |
| R7 | −5.45059 | d7 = | 0.652 | nd4 | 1.5441 v4 | 56.12 |
| R8 | −1.06559 | d8 = | 0.423 |  |  |  |
| R9 | −2.27432 | d9 = | 0.300 | nd5 | 1.5352 v5 | 56.12 |
| R10 | 1.81983 | d10 = | 0.380 |  |  |  |
| R11 | ∞ | d11 = | 0.210 | nd6 | 1.5168 v6 | 64.17 |
| R12 | ∞ | d12 = | 0.297 |  |  |  |

TABLE 2

| | Cone Constant | Aspherical Coefficient | | | | | | |
|---|---|---|---|---|---|---|---|---|
|  | k | A4 | A6 | A8 | A10 | A12 | A14 | A16 |
| R1 | 0.0000E+00 | −4.3042E−02 | 3.8293E−02 | −1.2892E−01 | −3.3351E−02 | 1.8354E−02 | 1.2960E−01 | −2.1322E−01 |
| R2 | 0.0000E+00 | −5.2550E−02 | −3.6548E−02 | 8.9880E−02 | −1.8457E−01 | −1.8202E−01 | 2.8566E−02 | 3.2613E−01 |
| R3 | 0.0000E+00 | 6.9307E−02 | 5.3892E−02 | −4.3950E−02 | −6.1308E−02 | −5.6935E−02 | 3.8346E−02 | 2.5155E−01 |
| R4 | 4.2937E+01 | 4.1345E−02 | 2.7444E−02 | 5.0237E−02 | 5.5740E−02 | −3.4491E−01 | −3.4512E−01 | 4.8504E−01 |

TABLE 2-continued

| | Cone Constant | Aspherical Coefficient | | | | | | |
|---|---|---|---|---|---|---|---|---|
| | k | A4 | A6 | A8 | A10 | A12 | A14 | A16 |
| R5 | −2.3493E+01 | −2.6772E−01 | 1.4134E−02 | −8.1572E−02 | 5.0665E−02 | 3.2134E−01 | 2.5407E−01 | −9.9961E−01 |
| R6 | 1.0228E+02 | −1.8084E−01 | −3.9335E−02 | 3.5110E−02 | 5.2923E−02 | 3.4296E−02 | 2.7951E−02 | −3.2544E−02 |
| R7 | 6.0416E+00 | 2.1199E−02 | −9.3625E−03 | −3.6559E−02 | 4.3694E−03 | 2.3423E−03 | 5.3642E−04 | 1.0065E−03 |
| R8 | −3.8078E+00 | −5.2175E−02 | 9.5488E−02 | −4.2782E−02 | 6.3043E−03 | −1.0701E−03 | 5.3397E−04 | −1.0824E−04 |
| R9 | −4.1635E+00 | −4.2477E−02 | 1.4211E−02 | 7.4958E−04 | −3.2385E−04 | −2.0647E−05 | −6.5336E−06 | 2.1780E−06 |
| R10 | −1.7642E+01 | −5.8725E−02 | 1.8568E−02 | −4.7810E−03 | 5.5850E−04 | −4.1474E−05 | −6.7509E−07 | 6.6135E−07 |

The values of the embodiments 1-3 and the corresponding values of the parameters specified in the condition (1)-(11) are listed in table 7.

As shown in table 7, the embodiment 1 meets the condition expressions (1) to (11).

Figure 3:
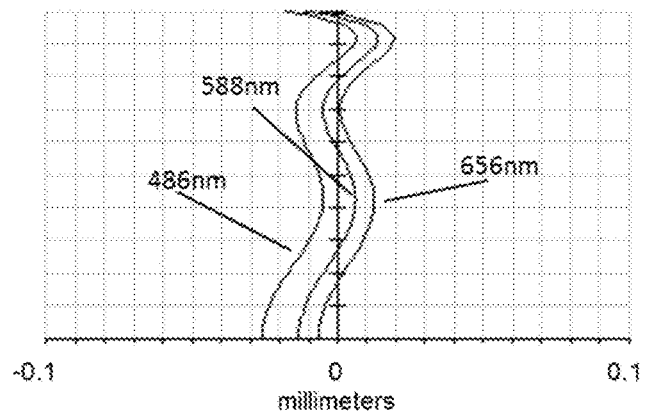
FIG. 3 is the diagram of the spherical aberration (axial chromatic aberration) of camera lens LA of embodiment 1 in the present invention.
Figure 4:
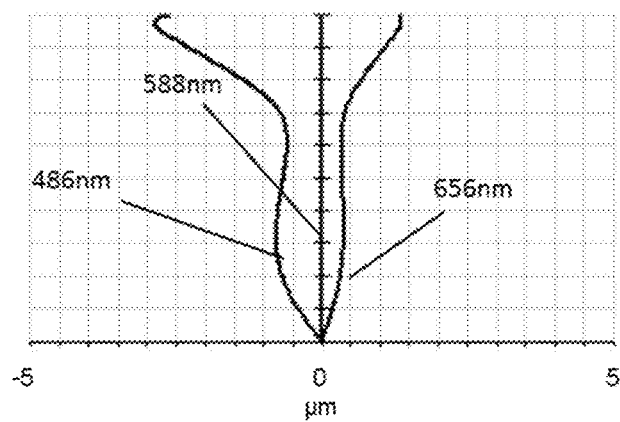
FIG. 4 is the diagram of the magnification chromatic aberration of the camera lens LA in the embodiment 1.
Figure 5:
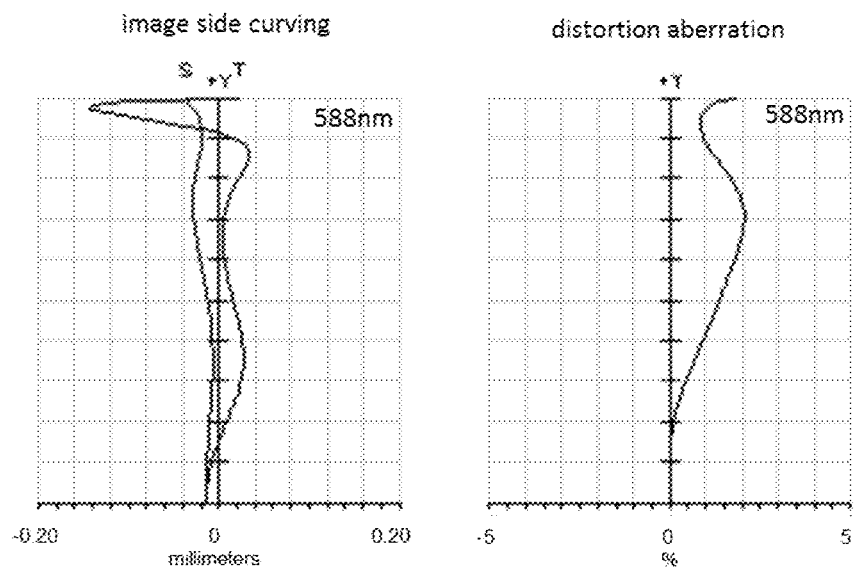
FIG. 5 is the diagram of the image side curving and distortion aberration of the camera lens LA in the embodiment 1

FIG. 3 is the diagram of the spherical aberration (axial chromatic aberration) of the camera lens LA in the embodiment 1. FIG. 4 is the diagram of the magnification chromatic aberration. FIG. 5 is the diagram of the image side curving and distortion aberration. In addition, the image side curving S in FIG. 5 is the image side curving relative to sagittal plane. T is the image side curving relative to the tangent image side. It is same also in embodiment 2 and 3. As shown in FIGS. 3 to 5, for full image angle 2ω=83.2°, TTL/IH=1.340, Fno=2.2 ultra-thin, high-luminous flux wide-angle lenses of the camera lens LA in the embodiment 1 are easy to understand that they have excellent optical properties.

Embodiment 2

Figure 6:
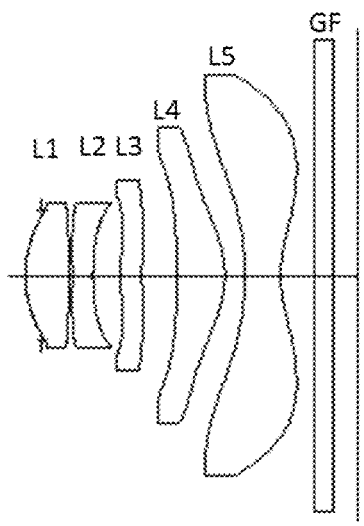
FIG. 6 is the structural diagram of the camera lens LA in the embodiment 2.

FIG. 6 is the structure diagram of the camera lens LA in embodiment 2. The table 3 shows the curvature radius R of the object side and the image side of the first lens L1 to the fifth lens L5 of the camera lens LA in embodiment 2, the center thickness of the lens and the distance d between lenses, refractive power nd, Abbe number v. The cone constant k and aspherical coefficient are shown in table 4.

TABLE 3

| | R | d | | nd | | vd |
|---|---|---|---|---|---|---|
| S1 | ∞ | d0 = | −0.200 | | | |
| R1 | 1.32597 | d1 = | 0.517 | nd1 | 1.5441 v1 | 56.12 |
| R2 | −24.64657 | d2 = | 0.041 | | | |
| R3 | −17.40667 | d3 = | 0.245 | nd2 | 1.6397 v2 | 23.53 |
| R4 | 3.04099 | d4 = | 0.330 | | | |
| R5 | 4.62528 | d5 = | 0.250 | nd3 | 1.6397 v3 | 23.53 |
| R6 | 5.38647 | d6 = | 0.419 | | | |
| R7 | −7.55214 | d7 = | 0.567 | nd4 | 1.5441 v4 | 56.12 |

TABLE 3-continued

| | R | d | | nd | | vd |
|---|---|---|---|---|---|---|
| R8 | −1.05508 | d8 = | 0.234 | | | |
| R9 | −3.76722 | d9 = | 0.427 | nd5 | 1.5352 v5 | 56.12 |
| R10 | 1.27512 | d10 = | 0.400 | | | |
| R11 | ∞ | d11 = | 0.210 | nd6 | 1.5168 v6 | 64.17 |
| R12 | ∞ | d12 = | 0.299 | | | |

TABLE 4

| | Cone Constant | Aspherical Coefficient | | | | | | |
|---|---|---|---|---|---|---|---|---|
| | k | A4 | A6 | A8 | A10 | A12 | A14 | A16 |
| R1 | 0.0000E+00 | −3.2658E−02 | 3.3391E−02 | −1.5794E−01 | 1.1019E−01 | −8.9450E−03 | −9.9653E−02 | −5.2890E−02 |
| R2 | 0.0000E+00 | 5.6151E−03 | −4.5920E−02 | 9.7651E−02 | −1.3961E−01 | −9.6117E−02 | −8.9794E−02 | 1.7696E−01 |
| R3 | 0.0000E+00 | 1.0155E−01 | 3.6921E−02 | −7.1528E−03 | −8.0541E−03 | −5.9895E−03 | −6.2553E−02 | 1.3745E−01 |
| R4 | 6.0126E+00 | 4.8819E−02 | 6.5903E−02 | 1.8431E−01 | −1.5087E−01 | −2.3992E−01 | 3.3935E−01 | 8.5715E−02 |
| R5 | 0.0000E+00 | −1.9956E−01 | 5.7567E−02 | −5.5773E−02 | 4.0811E−02 | 3.6255E−02 | 3.5534E−02 | −1.2570E−01 |
| R6 | −3.8921E+01 | −1.3221E−01 | 2.0691E−02 | −1.1699E−02 | 2.1660E−02 | 1.4060E−02 | 7.0565E−03 | −1.2646E−02 |
| R7 | 1.4371E+01 | −4.3762E−03 | 2.1200E−02 | −3.5659E−02 | 1.2330E−02 | 4.7038E−04 | −4.9073E−04 | 3.0363E−05 |
| R8 | −5.3498E+00 | −7.1466E−02 | 1.2806E−01 | −6.8330E−02 | 1.6710E−02 | −1.9709E−03 | 6.5939E−05 | 7.1113E−06 |
| R9 | 0.0000E+00 | −3.5492E−02 | 1.6631E−02 | 2.0995E−05 | −6.8215E−04 | 6.9633E−05 | 6.7207E−06 | −1.1443E−06 |
| R10 | −9.5940E+00 | −7.1070E−02 | 2.3899E−02 | −6.9227E−03 | 1.0520E−03 | −8.1712E−05 | −4.5070E−07 | 4.7318E−07 |

As shown in table 7, the embodiment 2 meets the condition expressions (1) to (11).

Figure 7:
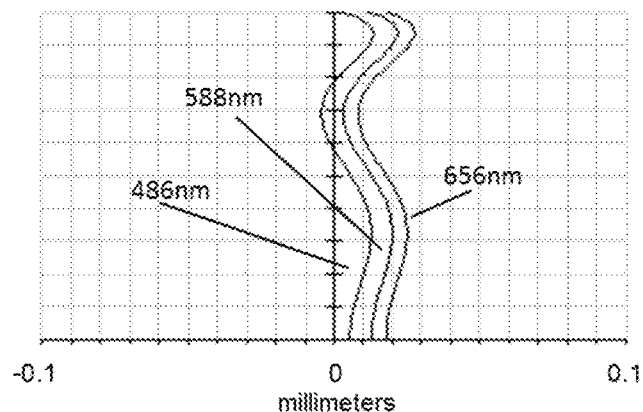
FIG. 7 is the diagram of the spherical aberration (axial chromatic aberration) of camera lens LA of embodiment 2 in the present invention.
Figure 8:
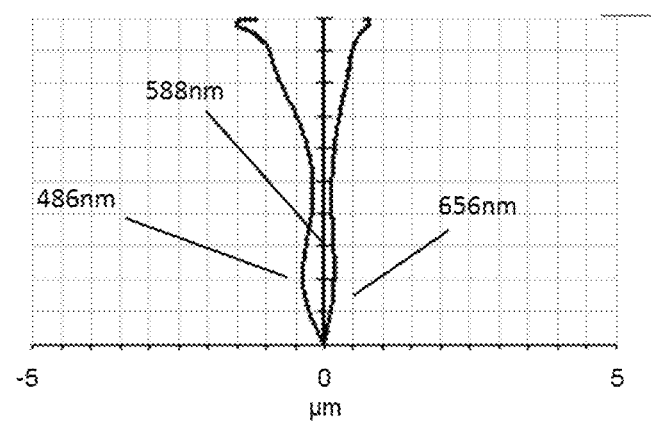
FIG. 8 is the diagram of the magnification chromatic aberration of the camera lens LA in the embodiment 2.
Figure 9:
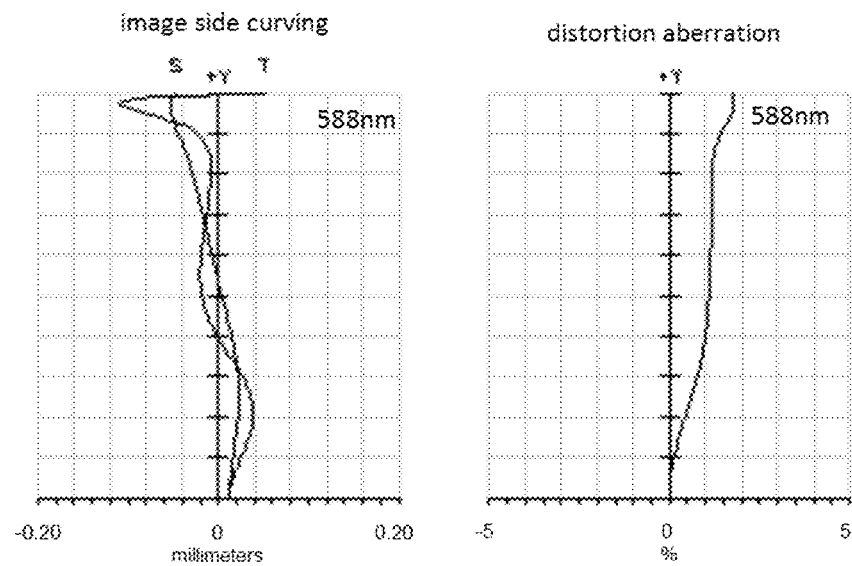
FIG. 9 is the diagram of the image side curving and distortion aberration of the camera lens LA in the embodiment 2.

FIG. 7 is the diagram of the spherical aberration (axial chromatic aberration) of the camera lens LA in the embodiment 2. FIG. 8 is the diagram of the magnification chromatic aberration. FIG. 9 is the diagram of the image side curving and distortion aberration. As shown in FIGS. 7 to 9, for full image angle 2ω=81.8°, TTL/IH=1.343, Fno=2.2 ultra-thin, high-luminous flux wide-angle lenses of the camera lens LA in the embodiment 2 are easy to understand that they have excellent optical properties.

Embodiment 3

Figure 10:
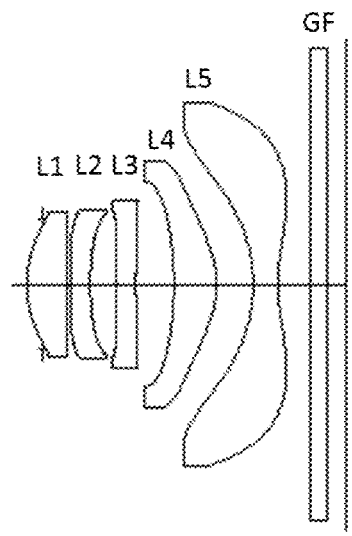
FIG. 10 is the structural diagram of the camera lens LA in the embodiment 3.

FIG. 10 is the structure diagram of the camera lens LA in embodiment 3. Table 5 shows the curvature radius R of the object side and the image side of the first lens L1 to the fifth lens L5 of the camera lens LA in embodiment 3, the center thickness of the lens and the distance d between lenses, the refractive power nd, Abbe number v. The cone constant k and aspherical coefficient are shown in table 6.

TABLE 5

| | R | d | | nd | | vd |
|---|---|---|---|---|---|---|
| S1 | ∞ | d0 = | −0.200 | | | |
| R1 | 1.34758 | d1 = | 0.484 | nd1 | 1.5441 v1 | 56.12 |
| R2 | 18.25046 | d2 = | 0.048 | | | |
| R3 | −102.70161 | d3 = | 0.249 | nd2 | 1.6397 v2 | 23.53 |

TABLE 5-continued

| | R | d | | nd | | vd |
|---|---|---|---|---|---|---|
| R4 | 4.00770 | d4 = | 0.310 | | | |
| R5 | 4.86413 | d5 = | 0.249 | nd3 | 1.6397 v3 | 23.53 |
| R6 | 5.68307 | d6 = | 0.468 | | | |
| R7 | −4.26817 | d7 = | 0.530 | nd4 | 1.5441 v4 | 56.12 |
| R8 | −1.11615 | d8 = | 0.446 | | | |
| R9 | −2.00609 | d9 = | 0.300 | nd5 | 1.5352 v5 | 56.12 |
| R10 | 1.83228 | d10 = | 0.400 | | | |
| R11 | ∞ | d11 = | 0.210 | nd6 | 1.5168 v6 | 64.17 |
| R12 | ∞ | d12 = | 0.239 | | | |

TABLE 6

| | Cone Constant | Aspherical Coefficient | | | | | | |
|---|---|---|---|---|---|---|---|---|
| | k | A4 | A6 | A8 | A10 | A12 | A14 | A16 |
| R1 | 0.0000E+00 | −5.4470E−02 | 5.0830E−02 | −1.5303E−01 | 1.1976E−01 | 1.6910E−03 | −9.3858E−02 | −4.2563E−02 |
| R2 | 0.0000E+00 | 2.4334E−02 | −4.5982E−03 | 1.0378E−01 | −1.4107E−01 | −9.8221E−02 | −9.8461E−02 | 1.5410E−01 |
| R3 | 0.0000E+00 | 1.3811E−01 | 5.4639E−02 | 2.5720E−03 | −9.0089E−03 | −1.8655E−02 | −8.2739E−02 | 1.1328E−01 |
| R4 | 1.7672E+00 | 6.6058E−02 | 4.6275E−02 | 1.8143E−01 | −1.3970E−01 | −2.3554E−01 | 3.1663E−01 | 1.8854E−02 |
| R5 | 0.0000E+00 | −2.0388E−01 | 5.4817E−02 | −3.9087E−02 | 5.2202E−02 | 3.2898E−02 | 3.3907E−02 | −1.5152E−01 |
| R6 | −3.5582E+01 | −1.2478E−01 | 2.9468E−02 | −5.1730E−05 | 3.0303E−02 | 2.5172E−02 | 1.1422E−02 | −1.9210E−02 |
| R7 | 1.0551E+01 | 1.4850E−02 | 2.3035E−02 | −3.6352E−02 | 1.1994E−02 | 5.8692E−04 | −1.4701E−04 | 4.4042E−04 |
| R8 | −3.8253E+00 | −7.7231E−02 | 1.2732E−01 | −6.8572E−02 | 1.6537E−02 | −2.0853E−03 | 1.0011E−05 | −1.8272E−05 |
| R9 | 0.0000E+00 | −2.8072E−02 | 1.7915E−02 | 3.5110E−04 | −5.8874E−04 | 9.7968E−05 | 1.4340E−05 | 5.0044E−07 |
| R10 | −1.4688E+01 | −7.6300E−02 | 2.3316E−02 | −6.9460E−03 | 1.0520E−03 | −8.2627E−05 | −1.0070E−06 | 2.7140E−07 |

As shown in table 7, the embodiment 3 meets the condition expressions (1) to (11).

Figure 11:
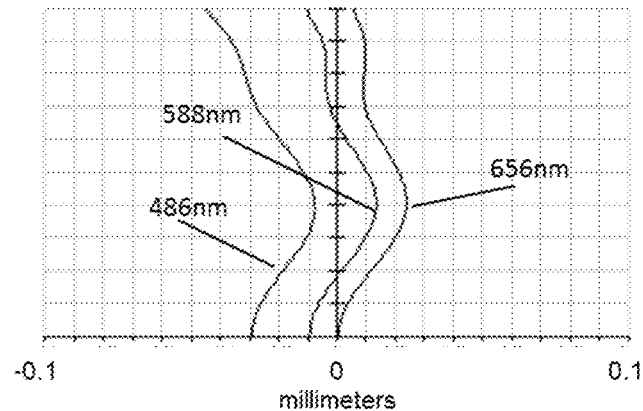
FIG. 11 is the diagram of the spherical aberration (axial chromatic aberration) of camera lens LA of embodiment 3 in the present invention.
Figure 12:
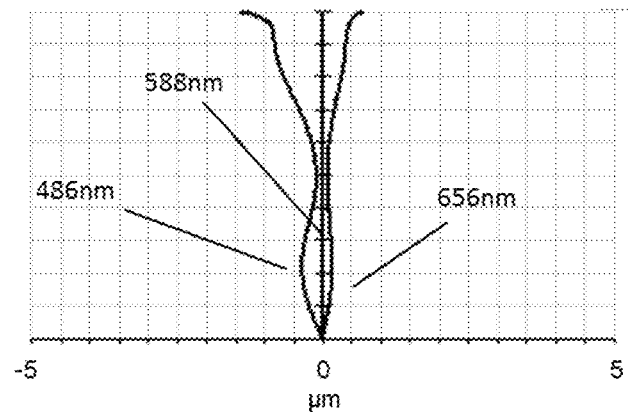
FIG. 12 is the diagram of the magnification chromatic aberration of the camera lens LA in the embodiment 1.
Figure 13:
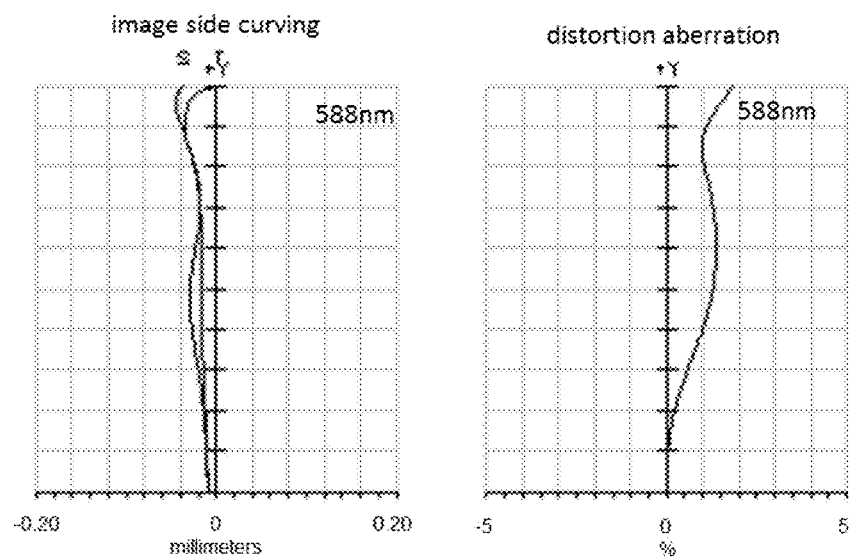
FIG. 13 is the diagram of the image side curving and distortion aberration of the camera lens LA in the embodiment 3.

FIG. 11 is the diagram of the spherical aberration (axial chromatic aberration) of the camera lens LA in the embodiment 3. FIG. 12 is the diagram of the magnification chromatic aberration. FIG. 13 is the diagram of the image side curving and distortion aberration. As shown in FIGS. 11 to 13, for full image angle 2ω=79.0°, TTL/IH=1.340, Fno=2.2 ultra-thin, high-luminous flux wide-angle lenses of the camera lens LA in the embodiment 3 are easy to understand that they have excellent optical properties.

The values of the embodiments and the corresponding values of the parameters specified in condition expressions (1) to (11) are listed in table 7. In addition, the unit shown in table X are respectively 2ω (°)、f (mm)、f1 (mm)、f2 (m m)、f3 (mm)、f4 (mm)、f5 (mm)、TTL (m m)、LB (mm)、IH (mm)。

TABLE 7

| | Embodiment 1 | Embodiment 2 | Embodiment 3 | Remarks |
|---|---|---|---|---|
| f1/f | 0.764 | 0.696 | 0.761 | (1) |
| |f3|/f | 39.676 | 13.550 | 13.551 | (2) |
| (R1 + R2)/(R1 − R2) | −0.897 | −0.898 | −1.159 | (3) |
| (R3 + R4)/(R3 − R4) | −0.100 | 0.703 | 0.925 | (4) |
| (R7 + R8)/(R7 − R8) | 1.486 | 1.325 | 1.708 | (5) |
| (R9 + R10)/(R9 − R10) | 0.111 | 0.494 | 0.045 | (6) |
| d6/f | 0.106 | 0.125 | 0.134 | (7) |
| d8/f | 0.131 | 0.070 | 0.128 | (8) |
| f2/f | −1.731 | −1.203 | −1.731 | (9) |
| f4/f | 0.717 | 0.653 | 0.753 | (10) |
| f5/f | −0.571 | −0.517 | −0.500 | (11) |
| Fno | 2.20 | 2.20 | 2.20 | |
| 2ω | 83.2 | 81.8 | 79.0 | |
| TTL/IH | 1.340 | 1.343 | 1.340 | |
| f | 3.225 | 3.347 | 3.481 | |
| f1 | 2.464 | 2.329 | 2.647 | |

TABLE 7-continued

| | Embodiment 1 | Embodiment 2 | Embodiment 3 | Remarks |
|---|---|---|---|---|
| f2 | −5.583 | −4.028 | −6.024 | |
| f3 | −127.940 | 45.351 | 47.169 | |
| f4 | 2.313 | 2.187 | 2.622 | |
| f5 | −1.842 | −1.729 | −1.742 | |
| TTL | 3.933 | 3.939 | 3.933 | |
| LB | 0.887 | 0.909 | 0.849 | |
| IH | 2.934 | 2.934 | 2.934 | |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera lens comprising, lined up from the object side to the image side: a first lens with positive refractive power, a second lens with negative refractive power, a third lens with positive or negative refractive power, a fourth lens with positive refractive power, and a fifth lens with negative refractive power, wherein the camera lens satisfies the following conditions (1) to (8):

$$0.65 \leq f1/f \leq 0.78 \quad (1)$$

$$13.50 \leq |f3|/f \leq 45.00 \quad (2)$$

$$-1.20 \leq (R1+R2)/(R1-R2) \leq -0.75 \quad (3)$$

$$-0.15 \leq (R3+R4)/(R3-R4) \leq 0.93 \quad (4)$$

$$1.30 \leq (R7+R8)/(R7-R8) \leq 1.75 \quad (5)$$

$$0.03 \leq (R9+R10)/(R9-R10) \leq 0.50 \quad (6)$$

$$0.105 \leq d6/f \leq 0.150 \quad (7)$$

$$0.065 \leq d8/f \leq 0.150 \quad (8)$$

In which:
f: Overall focal distance of the lenses;
f1: The focal distance of the first lens;
f3: The focal distance of the third lens;
R1: The object side curvature radius of the first lens;
R2: The image side curvature radius of the first lens;
R3: The object side curvature radius of the second lens;
R4: The image side curvature radius of the second lens;
R7: The object side curvature radius of the fourth lens;

R8: The image side curvature radius of the fourth lens;
R9: The object side curvature radius of the fifth lens;
R10: The image side curvature radius of the fifth lens;
d6: The axial distance between the image side of the third lens and the object side of the fourth lens;
d8: The axial distance between the image side of the fourth lens and the object side of the fifth lens.

2. The camera lens according to claim 1 further satisfying the following condition:

$$-2.00 \leq f2/f \leq -0.90 \qquad (9)$$

In which
f: Overall focal distance of the lenses
f2: The focal distance of the second lens.

3. The camera lens according to claim 1 further satisfying the following condition (10):

$$0.50 \leq f4/f \leq 0.80 \qquad (10)$$

In which
f: Overall focal distance of the lenses;
f4: The focal distance of the fourth lens.

4. The camera lens according to claim 1 further satisfying the following condition:

$$-0.70 \leq f5/f \leq -0.45 \qquad (11)$$

In which
f: Overall focal distance of the lenses;
f5: The focal distance of the fifth lens.

* * * * *